(12) United States Patent
Anderson

(10) Patent No.: US 6,732,529 B2
(45) Date of Patent: May 11, 2004

(54) OFF LOADING CLUTCH FOR GAS TURBINE ENGINE STARTING

(75) Inventor: Stephen Arthur Anderson, Verdun (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 09/991,221

(22) Filed: Nov. 16, 2001

(65) Prior Publication Data

US 2004/0065091 A1 Apr. 8, 2004

(51) Int. Cl.$^7$ ................................................ F02C 1/00
(52) U.S. Cl. ..................... 60/772; 60/778; 192/21.5; 192/31
(58) Field of Search ................... 60/772, 778, 786, 60/39.01, 242, 226.3, 625, 773; 192/21.5, 20, 30 R, 31, 42, 53.2, 53.31, 54.1, 54.3, 56.4, 58.61, 84.1; 74/730, 731, 732, 745; 290/1 A, 36 R, 38 R, 47, 48

(56) References Cited

U.S. PATENT DOCUMENTS

| | | | |
|---|---|---|---|
| 2,857,740 A | * 10/1958 | Hall et al. ................... 60/35.6 |
| 3,415,346 A | 12/1968 | Boeskool | |
| 3,595,016 A | 7/1971 | Stockton | |
| 3,618,720 A | 11/1971 | Linke | |
| 3,722,213 A | 3/1973 | Carter et al. | |
| 3,835,642 A | 9/1974 | Amann | |
| 3,899,877 A | 8/1975 | Flanigan et al. | |
| 3,958,211 A | 5/1976 | van Suchtelen et al. | |
| 4,062,185 A | * 12/1977 | Snow ........................... 60/204 |
| 4,195,472 A | 4/1980 | Robinson | |
| 4,257,281 A | 3/1981 | Bunger | |
| 4,461,143 A | * 7/1984 | Shutt ........................... 60/788 |
| 4,542,722 A | * 9/1985 | Reynolds ................. 123/179 E |
| 4,799,354 A | * 1/1989 | Midgley ................... 60/39.142 |
| 4,864,812 A | * 9/1989 | Rodgers et al. .......... 60/39.091 |
| 5,174,109 A | * 12/1992 | Lampe ..................... 60/39.142 |
| 5,201,798 A | 4/1993 | Hogan | |
| 5,309,029 A | 5/1994 | Gregory et al. | |
| 5,845,753 A | * 12/1998 | Bansbach ................... 192/21.5 |

FOREIGN PATENT DOCUMENTS

| | | | |
|---|---|---|---|
| DE | 2414918 A1 | * 10/1975 |
| DE | 24 14 918 A | 10/1975 |
| FR | 1 519 667 A | 4/1968 |
| GB | 1 172 995 A | 12/1969 |
| GB | 1172995 | * 12/1969 |

* cited by examiner

Primary Examiner—Edward K. Look
Assistant Examiner—John F Belena
(74) Attorney, Agent, or Firm—Ogilvy Renault

(57) ABSTRACT

A method for gas turbine engine off-load starting includes using a starter connected to a rotor of a gas turbine engine to start the gas turbine engine while terminating or reducing torque transmission from the starter to accessory devices until a gas turbine engine starting cycle is completed and the gas turbine engine is operating under a self-sustaining condition.

15 Claims, 2 Drawing Sheets

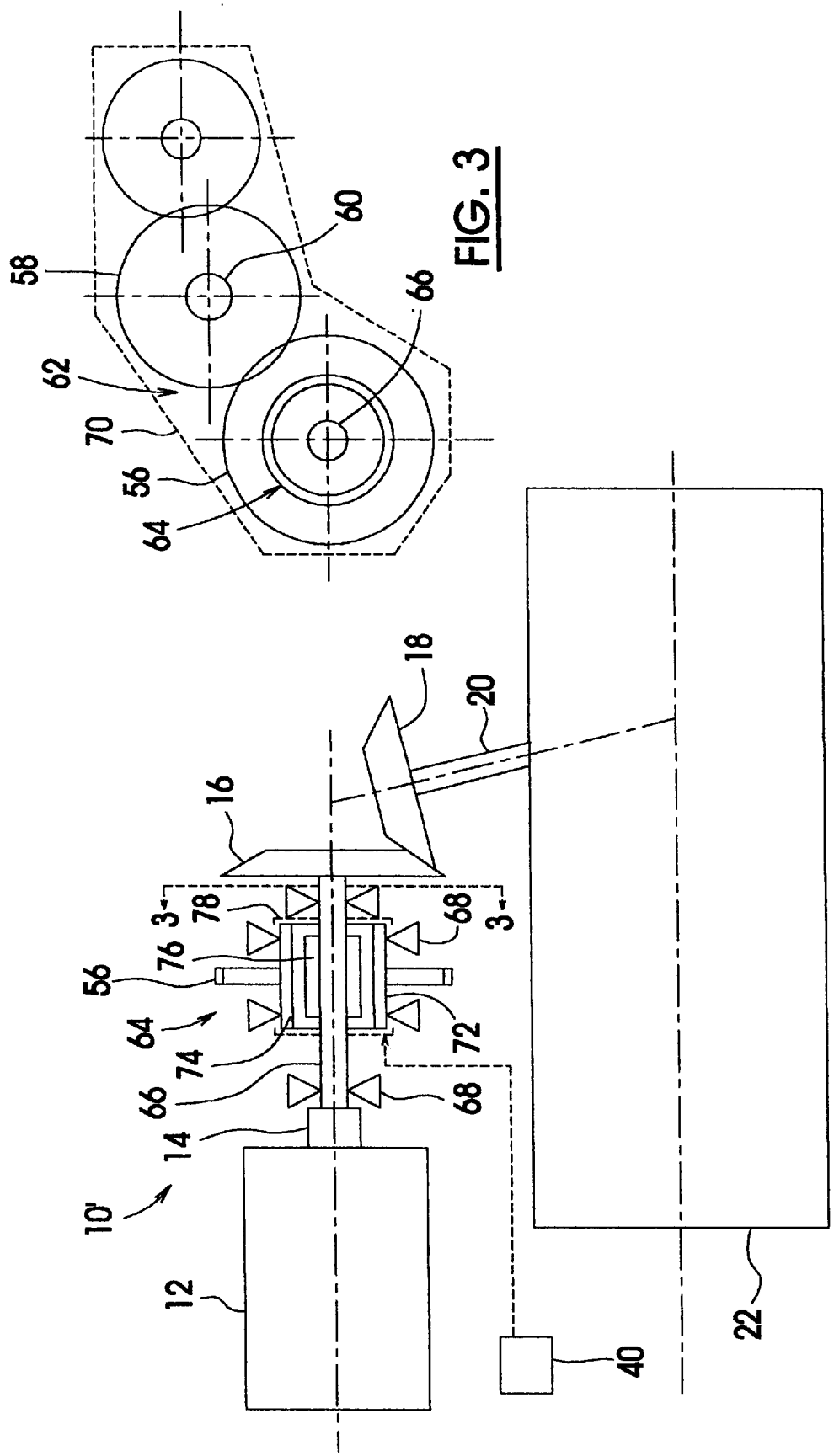

OFF LOADING CLUTCH FOR GAS
TURBINE ENGINE STARTING

FIELD OF THE INVENTION

The present invention relates to a gas turbine engine used for aircraft, and more particularly to a method and a system for gas turbine engine starting.

BACKGROUND OF THE INVENTION

Gas turbine engine starting typically requires the use of a powerful electric or pneumatic starter, which is usually mounted in an accessory gear box, to drive the compressor/turbine rotor, accessories connected to the accessory gear box, such as generators, pumps, air conditioning, etc., and engine system components integrated into the gear box, during the start sequence of the gas turbine engine. The starting cycle is completed when the gas turbine engine reaches a self-sustaining operative condition. In conventional practice, the electric or pneumatic starters provide drive torque during the start cycle to overcome the drag from the compressor and turbine rotors, and loads resulting from all of the accessories connected to the accessory gearbox drive train driven by the starter.

The power source for actuating a starter motor of a gas turbine engine used in aircraft generally includes electric power stored in batteries or pressurized fluid provided by an APU (Auxiliary Power Unit). The energy provided by those power sources is limited and therefore it is desirable to reduce the torque requirement for gas turbine engine starting.

Clutches are well known in the art and are used in gear trains of gas turbine engines for selectively establishing or terminating torque transmission through the gear trains. U.S. Pat. No. 5,201,798, issued to Hogan on Apr. 12, 1993 describes one example of the use of one way clutches in the gear train of a gas turbine engine. A multiple function integrated power unit for use aboard aircraft includes two turbine engines operable under different conditions, an integrating gear box receiving power from the two engines selectively, and a plurality of accessory devices receiving shaft power from either of the two engines through the gear box. One clutch is used to connect a starter to the gear train to drive the first engine. After attaining self-sustaining speed, the first engine accelerates under its own power to its operating speed, and the flow of pressurized air to the starter is discontinued. The clutch ensures that the starter is not driven by the first engine. The first engine provides shaft power to the gear train within the gear box through a sprag clutch. The multiple integrated power unit also includes a second engine which is connected to the gear train within the gear box through another sprag clutch so that when the accessories are driven by either one of the two engines the other engine will not be driven.

U.S. Pat. No. 4,257,281, issued to Bunger on Mar. 24, 1981 also describes the use of an over-running clutch incorporated into an engine starter and accessory drive system, so that the clutch is engaged to transfer torque from the starter to the engine and the accessory devices during the engine starting, and the clutch is disengaged to prevent torque from being transferred to the starter during engine operation.

Nevertheless, those systems generally prevent torque from being transmitted to the starter or other rotator during engine operation, and does not improve engine starting. Therefore, there is a need for a method and a system for improved engine starting.

SUMMARY OF THE INVENTION

One object of the present invention is to provide a method for gas turbine engine starting with a reduced load.

Another object of the present invention is to provide a gas turbine engine starting system which can start the gas turbine engine with a reduced load.

In accordance with one aspect of the present invention, the method of gas turbine engine starting comprises using a starter connected to a rotor of a gas turbine engine to start the gas turbine engine while terminating or reducing torque transmission from the starter to accessory devices until a gas turbine engine starting cycle is completed and the gas turbine engine is operating under a self-sustaining condition.

A clutch is preferably used for completely or partially disconnecting a drive system of the accessory devices from the rotor of the gas turbine engine before the gas turbine engine starting cycle begins. The drive system is used for distribution of torque from the rotor of the gas turbine engine to the accessory devices during gas turbine engine operation. Partial re-engagement of accessory drives can be accomplished to provide necessary drive to fuel pumps and oil pumps during the start sequence as required. When the gas turbine engine starting cycle is completed and the gas turbine engine is operating in the self-sustaining condition, the drive system of the accessory devices is fully reconnected to the rotor of the gas turbine engine. In one embodiment of the present invention, the clutch is a magnetic fluid clutch and it is controlled by an electronic controller of the gas turbine engine, or the air craft.

In accordance with another aspect of the present invention, a system is provided for starting a gas turbine engine. The system comprises a starter coupled to a rotor of the gas turbine engine by means of a torque transmitting mechanism. A clutch is provided to couple a drive system of accessory devices with the torque transmitting mechanism for controlling torque transmission from the torque transmitting mechanism to the drive system of the accessory devices while maintaining the torque transmission from the starter to the rotor of the gas turbine engine. Thus, torque required for the gas turbine engine starting can be reduced by completely or partially declutching the clutch during a gas turbine engine starting cycle.

The clutch is preferably a magnetic fluid clutch and is controlled by an electronic controller which is incorporated into the engine control system or the aircraft control system. The drive system of the accessory devices preferably comprises an accessory gear box for distribution of torque from the rotor of the gas turbine engine to the accessory devices during gas turbine engine operation. The magnetic fluid clutch according to one embodiment of the present invention includes a rotating shaft having a first end and a second end. A casing rotatably surrounds the rotating shaft and contains a magnetic fluid therein. The first end of the rotating shaft is coupled to the starter and the second end of the rotating shaft is connected to the rotor of the gas turbine engine. The casing is coupled to a gear train of the accessory gear box.

The magnetic fluid clutch according to another embodiment of the present invention, includes a stationary casing containing the magnetic fluid. A first rotating shaft and a second rotating shaft are provided. The respective rotating shafts extend oppositely and outwardly from the inside of the casing, and are rotatable relative to each other and relative to the casing. Each rotating shaft has a plate affixed thereto. The two plates are axially spaced apart and are disposed in the magnetic fluid contained within the casing. An electric coil is provided for applying an electric-magnetic field to the magnetic fluid. The electric coil is controlled by an electronic controller which could be incorporated into the control system of the gas turbine engine or the control system of the aircraft. The first shaft of the magnetic fluid clutch is coupled to the starter and is also connected to the rotor of the gas turbine engine. The second rotor shaft of the magnetic fluid clutch is connected to a gear train of the accessory gear box.

In the system of the present invention, torque transmission between the starter and the rotor of the gas turbine engines is ensured by the structure, and torque transmission from the engine rotor/starter system to the accessory devices is controlled by the magnetic fluid clutch. Thus, the accessory devices can be completely or partially disconnected from the engine rotor/starter system during a starting cycle to reduce a total amount of torque provided by the starter for engine starting.

Reduced load from accessories, is especially beneficial during starting at cold temperatures. Additionally, the clutch can disengage accessories during engine shut down, thereby avoiding injection of excess fuel and oil into the engine.

Other advantages and features of the present invention will be better understood with reference to preferred embodiments of the present invention described hereinafter.

BRIEF DESCRIPTION OF THE DRAWINGS

Having thus generally described the nature of the present invention, reference will now be made to the accompanying drawings, showing by way of illustration the preferred embodiments thereof, in which:

FIG. 2 is a schematic illustration of a gas turbine engine starting system according to another embodiment of the present invention; and FIG. 3 is a schematic illustration of an accessory gear box in a side view thereof, incorporated with the embodiment shown in FIG. 2.

DETAILED DESCRIPTION OF THE PREFERRED EMBODIMENTS

Figure 1:
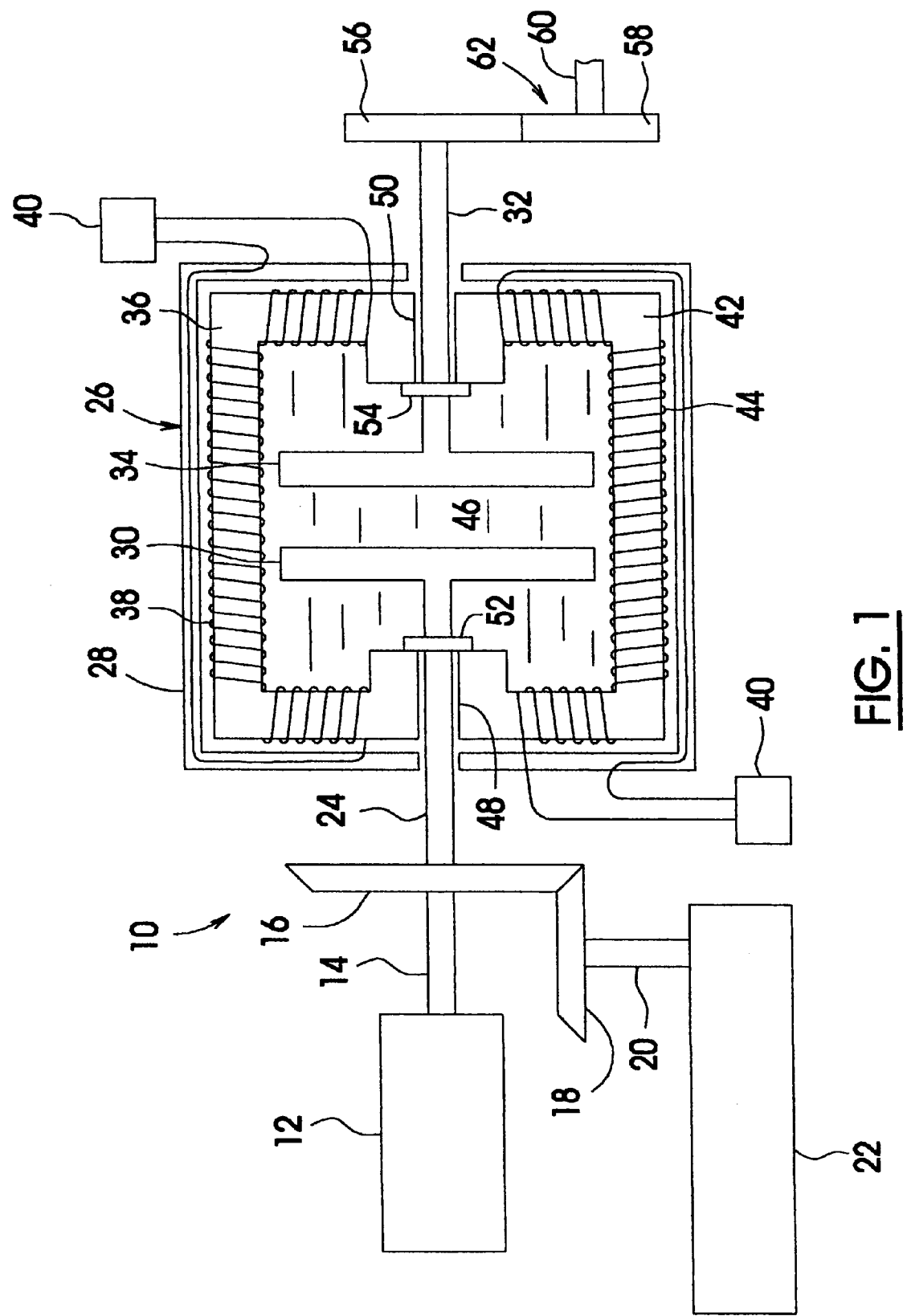
FIG. 1 is a schematic illustration of a gas turbine engine starting system according to one embodiment of the present invention.

Referring to FIG. 1, a gas turbine engine starting system, generally indicated by numeral 10 includes an electric or pneumatic starter motor 12 which is actuated by electric power stored in batteries or by pressurized air stored in pressure containing chambers or is provided by an Auxiliary Power Unit (neither are shown). The starter motor 12 has a torque output shaft 14 on which a gear 16 is affixed in order to rotate together with the torque output shaft 14 of the starter motor 12. The gear 16 is engaged with gear 18 which is affixed to a rotating shaft 20. The rotating shaft 20 is coupled to the rotor 22 of the gas turbine engine (not shown). The rotor 22 generally includes compressors and turbines of the gas turbine engine which rotate at high speeds during engine operation powered by the torque power generated by the gas turbine engine. However, input torque is needed to drive the rotor 22 for rotation when the engine is being started, and until the rotor 22 reaches a rotational speed at which the engine can operate in a self-sustaining condition. The torque output shaft 14, gears 16, 18 and the rotating shaft 20 in combination form a torque transmitting mechanism to transmit torque generated by the starter motor 12 to the rotor 22 during a gas turbine engine starting cycle.

The torque output shaft 14 of the starter motor 12 is coupled to a torque input shaft 24 of a magnetic fluid clutch 26. The magnetic fluid clutch 26 includes a casing 28 supported in an accessory gear box (not shown) of the gas turbine engine. The torque input shaft 24 extends outwardly from the inside of the casing 28 and is rotatable relative to the casing 28. A first plate 30 is attached to the inner end of the torque input shaft 24 and is rotatable together with the shaft 24. The magnetic fluid clutch 26 further includes a torque output shaft 32 which extends, oppositely with respect to the torque input shaft 24, outwardly from the inside of the casing 28 and is rotatable relative to the casing 28. A second plate 34 is attached to an inner end of the torque output shaft 32 and is rotatable together with the shaft 32. The torque input and output shafts 24, 32 are positioned co-axially and the first and second plates 30, 34 are axially spaced apart from each other.

The magnetic fluid clutch 26 further includes a first core material 36 and a coil 38 wound around the first core material 36. The two ends of the coil 38 are connected to an electronic controller 40 which is incorporated into a control system of the gas turbine engine or the control system of the aircraft which is equipped with the gas turbine engine. A second core material 42 like-wise has a coil 44 wound therearound. The two ends of the coil 44 are connected to the electronic controller 40 which is the same one controlling the coil 38, but is illustrated separately for convenience of illustration.

Both the first and second plates 30, 34 are immersed in a magnetic fluid medium which is generally designated 46 and is contained within the casing 28. Preferably, the core materials 36, 42 are positioned within the casing 28 and the magnetic fluid medium 46 is contained by an interior surface of the core materials 36, 42. Alternatively, an inner casing (not shown) may be provided to protect coils 38 and 44. The first and second plates 30, 34 and the first and second core materials 36, 42 preferably have a circular cross-section. The size of the first and second plates 30, 34 and the volume of the magnetic fluid medium 46 are determined by the specific properties of the magnetic fluid medium chosen, as well as the performance specifications of the magnetic fluid clutch 26.

The torque input shaft 24 and the torque output shaft 32 pass through axially aligned openings 48, 50 defined by core materials 36, 42. Seals 52, 54 are also preferably placed between openings 48, 50 and the magnetic fluid medium 46, to prevent leakage thereof. The electronic controller 40 provides current through coils 38, 44 in a controlled manner in order to apply a magnetic field to the magnetic fluid medium 46.

A gear 56 is attached to an outer end of the torque output shaft 32 and is rotatable together with the shaft 32. The gear 56 engages a corresponding gear 58 affixed on a shaft 60 which is part of a drive system such as an accessory gear box, similar to that illustrated in FIG. 3, for distribution of torque from the rotor 22 of the gas turbine engine to the accessory devices (not shown) during gas turbine engine operation.

The magnetic fluid clutch 26 provides a magnetically controlled fluid coupling between the first and second plates 30, 34. Magnetic fluid medium 46 contains magnetically polarized particles. When a magnetic field which can be generated and controlled by current through the coils 38, 44, is applied to the magnetic fluid medium 46, particle chains form. In effect, magnetic fluid medium 46 changes from a free flowing state (steady-state liquid phase) to a highly viscose state (steady-state quasi-solid phase) when current is steadily increased through coils 38, 44. Various intermediate levels of viscosity can be obtained by varying the magnetic field applied to the magnetic fluid medium 46. Advantageously, the response time for magnetic fluid medium 46 to change between a steady-state quasi-solid phase to a steady-state liquid phase is in the millisecond range. Therefore, torque transfer control changes can be performed very quickly.

During operation, before the gas turbine engine starting cycle begins, the electronic controller 40 supplies no current or only a small amount of current through the coils 38, 44 in order to maintain the magnetic fluid medium 46 in a substantially steady-state liquid phase. The starter motor 12 is then actuated to drive the rotor 22 of the gas turbine engine through the drive system formed by torque output shaft 14, gears 16, 18 and the rotating shaft 20. The first plate 30 of the magnetic fluid clutch 26 is also rotated by the starter motor 12 through the coupling of the torque output shaft 14 of the starter motor 12 and the torque input shaft 24 of the clutch 26. However, the plate 34 which is coupled to the drive system 62 of the accessory devices through output shaft 32 and gear 56, remains substantially immobile because the friction between the respective plates 30, 34 and the magnetic fluid medium 46 in the steady-state liquid phase is not enough to transmit torque from the first plate 30 to the second plate 34 in order to drive the accessory devices.

When the rotor 22 of the gas turbine engine reaches a rotational speed required for injection of fuel and oil into the engine, partial re-engagement of the clutch can be accomplished to provide the necessary drive to fuel and oil pump systems. When the engine reaches a steady self-sustaining condition and begins acceleration under its own power, the control system of the gas turbine engine or the control system of the aircraft stops the energy supply (current or pressurized fluid) to the starter motor 12 and the controller 40 increases the supply of current to the coils 38, 44 in order to produce and increase the electric-magnetic field applied to the magnetic fluid medium 46 so that the viscosity of the magnetic fluid medium 46 increases and the magnetic fluid medium 46 becomes a steady-state quasi-solid. The friction between the respective plates 30, 34 and the magnetic fluid medium 46 in steady-state quasi-solid phase is enough to allow torque transmission from plate 30 to plate 34, thereby providing the torque required to drive all required accessory devices. Thus, the torque generated by the rotor 22 of the gas turbine engine is transmitted through the magnetic fluid clutch 26 to the drive system 62 of the accessory devices after the gas turbine engine starting cycle is completed and the rotor 22 of the gas turbine engine is operating under the self-sustaining condition.

It is noted that various intermediate levels of viscosity of the magnetic fluid medium 46 can be obtained by varying the electric-magnetic field applied to the magnetic fluid medium 46 so that the first and second plates 30, 34 can be partially declutched. In the partially declutched state, rotation slippage occurs between the first and second plates 30, 34 when the torque to be transmitted is greater than a selected level and thereby only a reduced amount of torque is transmitted to the accessory drive system 62. This provides an option in a gas turbine engine starting cycle, to partially de-clutch the magnetic fluid clutch 26 in order to provide a reduced amount of torque to the accessory devices when it is required.

In one embodiment of the present invention the entire torque generation capacity of the starter motor 12 can be used to start the engine rotor 22 from its stationary state at the very beginning of the engine starting cycle by completely declutching the magnetic fluid clutch 26. After a moment, the magnetic fluid clutch 26 can be partially declutched to allow only a reduced torque level to be transmitted so that fuel pumps and oil pumps for example, can work in a partial load condition to provide a small percentage of the full fuel and oil supply to the combustor and bearings of the engine during the gas turbine engine starting cycle. When the gas turbine engine operates in its self-sustaining condition and generates torque to drive the accessory devices, the magnetic fluid clutch 26 is completely clutched so that the accessory devices, including the fuel and ail pumps work in their full load conditions.

FIGS. 2 and 3 illustrate another embodiment of the present invention in which parts similar to those in FIG. 1 are indicated by similar numerals and will not be redundantly described. In this embodiment of the present invention, a magnetic fluid clutch 64 which has a configuration different from that of the magnetic fluid clutch 26 in FIG. 1, is used in the gas turbine engine starting system 10' as an alternative to the magnetic fluid clutch 26 used in the gas turbine engine starting system 10 illustrated in FIG. 1.

The magnetic fluid clutch 64 includes a rotating shaft 66 rotatably supported by bearings 68 in a gear box 70, and a cylindrical casing 72 rotatably surrounding the rotating shaft 66. The casing 72 is also rotatably supported by bearings 68 in the gear box 70. The rotatable casing 72 contains the magnetic fluid medium (not indicated) therein. The torque input end of the rotating shaft 66 is coupled to the torque output shaft 14 of the starter motor 12 and the torque output end of the rotating shaft 66 is connected to gear 16 which engages gear 18 on the rotating shaft 20 which is itself coupled to the rotor 22 of the gas turbine engine (not shown). The torque output gear 56 is affixed to the external periphery of the rotatable casing 72 and engages the gear 58 in the accessory gear box 70. The accessory gear box 70 supports the starter motor 12, and houses the magnetic fluid clutch 64, and gear trains forming the drive system 62 of the accessory devices, and can be in a configuration different from that shown in FIG. 3. Rotating members 74 and 76 are provided to the respective rotatable casing 72 and the rotating shaft 66, respectively. The rotating members 74, 76 are both immersed in the magnetic fluid medium within the rotatable casing 72 in order to increase the frictional contact of the respective rotatable casing 72 and the rotating shaft 66 with the magnetic fluid medium. For example, the rotating member 74 can comprise a plurality of axially extending blades attached to the interior surface of the rotatable casing 72 and circumferentially spaced apart from one another. Similarly, the rotating member 76 can also comprise a plurality of axially extending blades attached to the rotating shaft 66 and circumferentially spaced apart from one another. The rotating members 74, 76 are radially spaced apart to prevent interference when they rotate respectively.

A pair of coils 78 which are shown with broken lines as a general schematic illustration, are provided to apply an adjustable magnetic field to the magnetic fluid medium within the rotatable casing 72, and are controlled by the electronic controller 40. It is understood that the electric coil 78 is wound around core materials (not shown) and can be positioned either inside or outside of the casing 72. The coils 78 as shown in FIG. 2 are placed outside and at opposite ends of the rotatable casing 72, which allows the coils 78 to be supported on a stationary structure of the gear box 70. When the coils 78 are disposed within the rotatable casing 72, and are supported by and rotated together with either the rotatable casing 72 or the rotating shaft 66, special electrical connectors must be provided for electrical connection between the rotating coils 78 and the electronic controller 40.

In operation, the torque transmission between the starter motor 12 and the rotor 22 of the gas turbine engine is ensured by the mechanical linkage of the torque output shaft 14 of the starter motor 12, the rotating shaft 66 of the magnetic fluid clutch 64, the gears 16, 18 and the rotating shaft 20. Although torque transmission between the starter motor 12 and the rotor 22 of the gas turbine engine is conducted through the rotating shaft 66 of the magnetic fluid clutch 64, the clutch operation does not affect such torque transmission. However, torque transmitted from the starter motor 12 to the drive system 62 associated with the accessory gear box 70 can be controlled through the clutch operation. During the gas turbine engine starting cycle, the electronic controller 40 ensures the steady-state liquid phase of the magnetic fluid medium in the rotatable casing 72 in order to declutch the magnetic fluid clutch 64 so that the rotatable casing 72 does not rotate in response to the rotation of the rotating shaft 66. Thus, torque transmission from the starter motor 12 to the drive system 62 associated with the accessory gear box 70 is terminated. Alternately, if a partial workload for the drive system 62 associated with the accessory gear box 70 is required, the electronic controller 40 can change the viscosity of the magnetic fluid medium in the rotatable casing 72 to a selected one of various intermediate levels between the steady-state liquid phase and the steady-state quasi-solid phase in order to partially declutch the magnetic fluid clutch 64 so that torque can be transmitted from the starter motor 12 to the drive system 62 of the various accessory devices, but the amount of transmitted torque is reduced in contrast to that required for a full load of the accessory devices.

When the gas turbine engine starting cycle is completed and the gas turbine engine is operating under a self-sustaining condition, the electronic controller 40 completely clutches the magnetic fluid clutch 64 by increasing current through the coils 78 to generate and maintain a steady-state quasi-solid phase of the magnetic fluid contained within the rotatable casing 72 so that the rotatable casing 72 rotates in response to the rotation of the rotating shaft 66 which is now driven by the rotor 22 of the gas turbine engine through the rotating shaft 20 and the gears 16, 18. Thus, torque is transmitted from the rotor 22 of the gas turbine engine to the various accessory devices which are operated under full workload conditions during the gas turbine engine operation.

In this embodiment of the present invention, the magnetic fluid clutch 64 couples the respective starter motor 12 and the rotor 22 of the gas turbine engine at the opposite ends of the rotating shaft 66 and couples the drive system 62 of the accessory devices at the middle of the magnetic fluid clutch 64 through the torque output gear 56. This configuration provides convenience by allowing the starter motor 12 to be disposed along with the magnetic fluid clutch 64, within the accessory gear box 70. Gear 16 is conveniently disposed within or outside of the accessory gear box 70 for connection to the rotor 22 of the gas turbine engine.

The magnetic fluid clutches 26 and 64 described with reference to FIGS. 1 and 2 are used as examples to illustrate the present invention. Magnetic fluid clutches having configurations different from those of the magnetic fluid clutches 26, 64 illustrated in FIGS. 1 and 2 can also be used to implement the system according to the present invention. As a matter of fact, any type of clutch which does not use magnetic fluid but is controllable by a controller between a clutching state and a declutching state can be used to implement the gas turbine engine starting system according to this invention.

Modifications and improvements to the above-described embodiments of the present invention may become apparent to those skilled in the art. The foregoing description is intended to be exemplary rather than limiting. The scope of the invention is therefore intended to be limited solely by the scope of the appended claims.

I claim:

1. A method of gas turbine engine starting comprising:
   using a starter connected to a rotor of a gas turbine engine to start the gas turbine engine while partially clutching torque transmission from the rotor to accessory devices until a gas turbine engine starting cycle is completed and the gas turbine engine is operating under a self-sustaining condition.

2. A method as claimed in claim 1 further comprising:
   before the gas turbine engine starting cycle begins, completely declutching a drive system of the accessory devices from the rotor of the gas turbine engine, the drive system being used for distribution of torque from rotor of the the gas turbine engine to the accessory devices during gas turbine engine operation;
   partially clutching the drive system of the accessory devices to the rotor of the gas turbine engine during the-engine starting sequence; and
   fully clutching the drive system of the accessory devices to the rotor of the gas turbine engine when the gas turbine engine starting cycle is completed and the gas turbine engine is operating in a self-sustained condition.

3. A method as claimed in claim 2 further comprising:
   controlling the clutch between the gas turbine engine and the drive system of the accessory devices by means of an electronic controller.

4. A method as claimed in claim 3 wherein the clutch is a magnetic fluid clutch.

5. A method as claimed in claim 4 further comprising:
   controlling electric current in an electric coil of the magnetic fluid clutch to change a viscosity of a clutch torque transmitting fluid, thereby achieving a clutching, partial clutching and declutching function.

6. A method as claimed in claim 5 further comprising:
   declutching the magnetic fluid clutch to terminate torque transmission from the starter to the accessory devices when the gas turbine engine starting cycle begins;
   partially clutching the magnetic fluid clutch to permit a reduced torque level to be transmitted from the starter to the accessory devices in order to enable the accessory devices to work under partial loads during the gas turbine engine starting cycle a moment after the cycle begins; and
   clutching the magnetic fluid clutch to permit a full level of torque transmission from the rotor of the engine to the accessory devices in order to enable the accessory devices to work under full work loads after the gas turbine engine starting cycle is completed.

7. A system for starting a gas turbine engine comprising:
   a starter coupled to a rotor of the gas turbine engine by means of a torque transmitting mechanism;
   a clutch coupling a drive system of accessory devices with the torque transmitting mechanism for controlling torque transmission from the torque transmitting mechanism to the drive system of the accessory devices while maintaining the torque transmission from the starter to the rotor of the gas turbine engine so that torque required for gas turbine engine starting can be reduced; and a controller for partially declutching the clutch during a gas turbine engine starting cycle.

8. A system as claimed in claim 7 wherein the clutch is a magnetic fluid clutch controlled by an electronic controller.

9. A system as claimed in claim 8 wherein the drive system of the accessory devices comprises an accessory gearbox for distribution of torque from the rotor of the gas turbine engine to the accessory devices during gas turbine engine operation.

10. A system as claimed in claim 9 wherein the accessory gearbox comprises the magnetic fluid clutch.

11. A system as claimed in claim 10 wherein the magnetic fluid clutch comprises:

a rotating shaft having a first end and a second end;

a casing rotatably surrounding the rotating shaft and containing a magnetic fluid therein; and the first end of the rotating shaft being coupled to the starter, the second end of the rotating shaft being connected to the rotor of the gas turbine engine, and the casing being coupled to a gear train of the accessory gearbox.

12. A system as claimed in claim 11 wherein the magnetic fluid clutch comprises an electric coil applying an electric-magnetic field to the magnetic fluid, the electric coil being controlled by the electronic controller.

13. A system as claimed in claim 12 wherein the magnetic fluid clutch comprises a first rotating member affixed to the rotating shaft and a second rotating member affixed to an inside surface of the casing in order to increase frictional contact of the respective rotating shaft and the casing with the magnetic fluid.

14. A system as claimed in claim 10 wherein the magnetic fluid clutch comprises:

a stationary casing containing a magnetic fluid;

a first rotating shaft and a second rotating shaft, the respective rotating shafts extending oppositely and outwardly from inside of the casing, and being rotatable relative to each other and relative to the casing;

a first plate affixed to the first shaft and a second plate affixed to the second shaft, the first and second plate being axially spaced apart and disposed in the magnetic fluid; and an electric coil for applying an electric-magnetic field to the magnetic fluid, the electric coil being controlled by an electronic controller.

15. A system as claimed in claim 14 wherein the first shaft of the magnetic fluid clutch is coupled to the starter and connected to the rotor of the gas turbine engine, and the second rotating shaft of the magnetic fluid clutch is connected to a gear train of the accessory gearbox.

* * * * *